Figure 1:
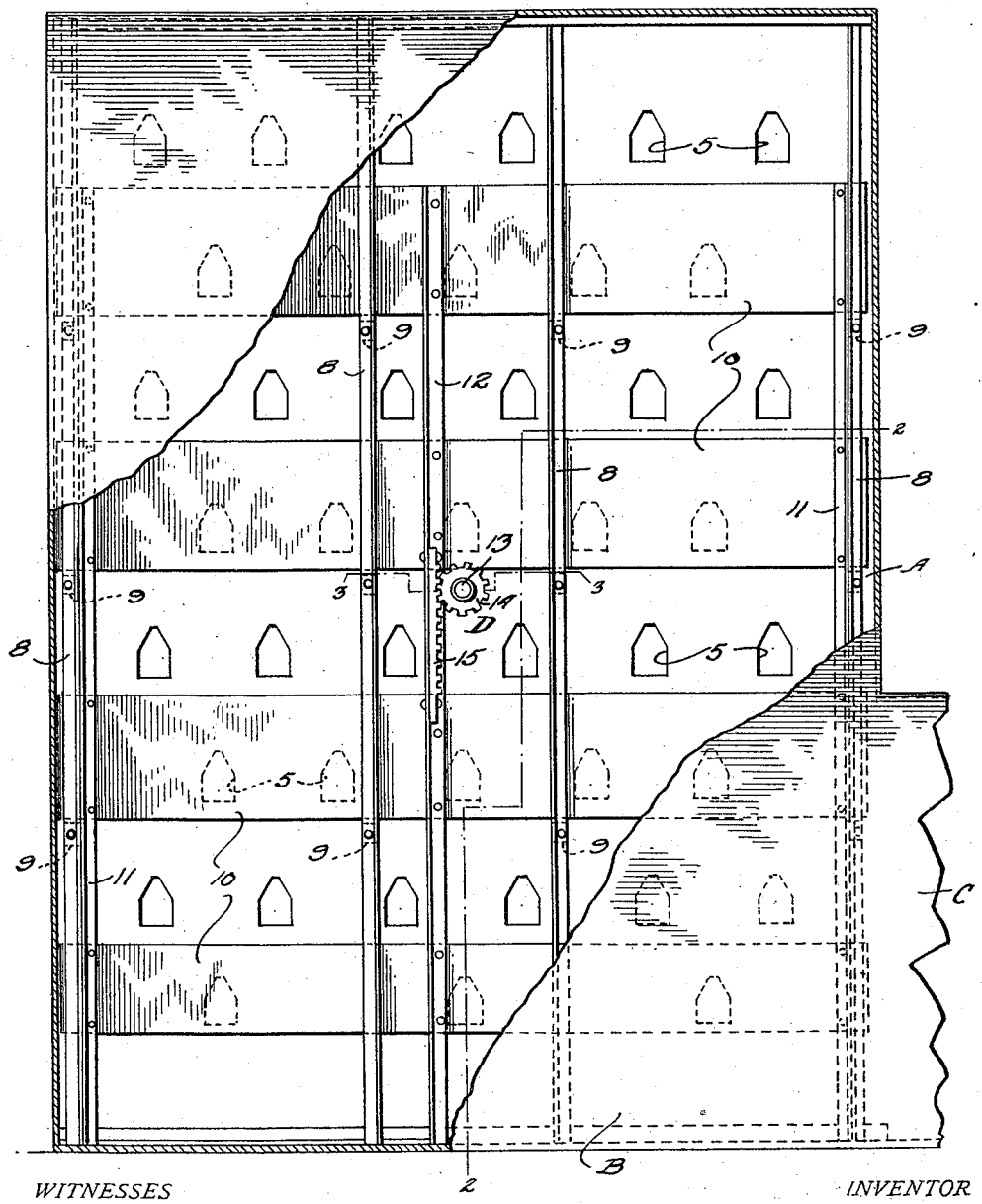

F. R. MORRIS.
DUCT CONTROL MECHANISM FOR GRAIN DRIERS.
APPLICATION FILED NOV. 19, 1912.

1,072,762.

Patented Sept. 9, 1913.

2 SHEETS—SHEET 1.

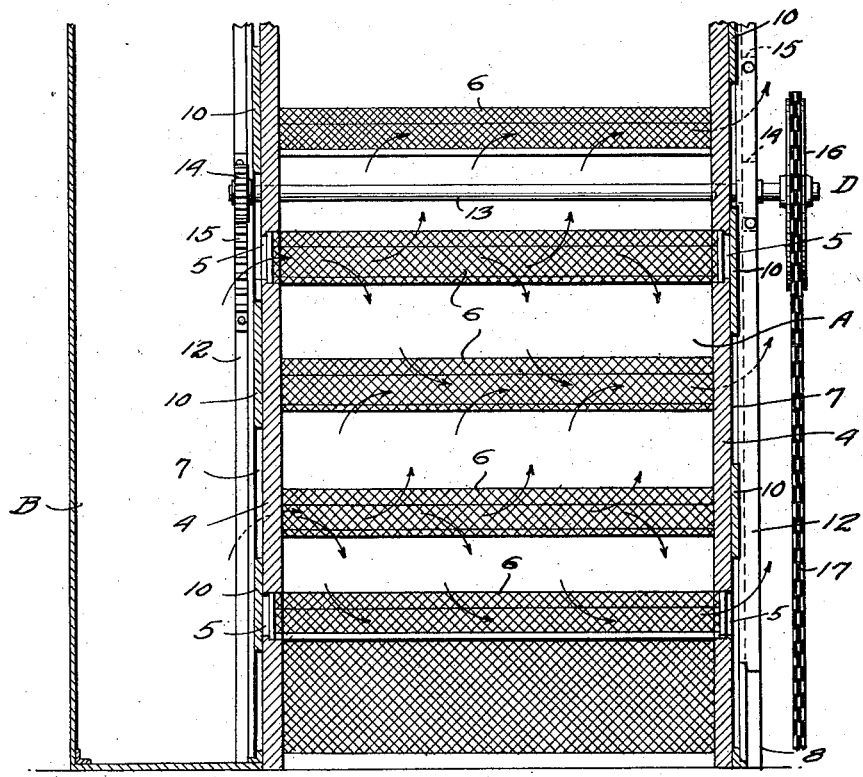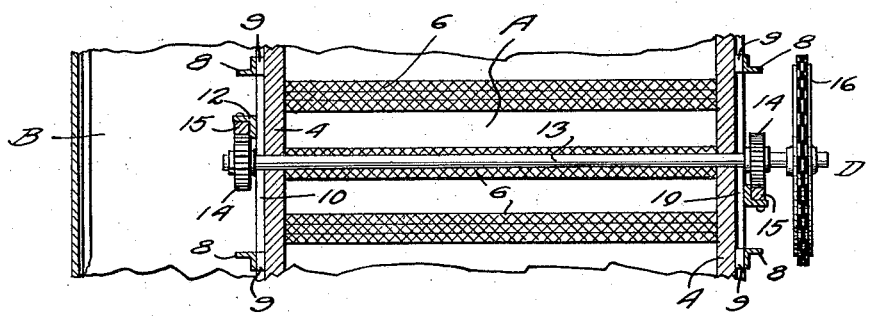

UNITED STATES PATENT OFFICE.

FULTON R. MORRIS, OF MILWAUKEE, WISCONSIN, ASSIGNOR TO MORRIS GRAIN DRIER COMPANY, OF MILWAUKEE, WISCONSIN, A CORPORATION OF WISCONSIN.

DUCT-CONTROL MECHANISM FOR GRAIN-DRIERS.

1,072,762. Specification of Letters Patent. Patented Sept. 9, 1913.

Application filed November 19, 1912. Serial No. 732,357.

*To all whom it may concern:*

Be it known that I, FULTON R. MORRIS, a citizen of the United States, residing at Milwaukee, in the county of Milwaukee and State of Wisconsin, have invented new and useful Improvements in Duct-Control Mechanism for Grain-Driers, of which the following is a specification.

The present invention relates to duct control mechanism for grain driers of the character described in the copending application for Letters Patent filed by me on November 19, 1912, and bearing Serial Number 732,356. Driers of this class include a suitable chamber to contain the grain to be acted upon, through which chamber extends, transversely, ducts, pervious to fluid, so that air of the desired temperature may be agitated to filter through the grain removing excess moisture therefrom.

The principal object of the invention is to provide simple mechanism for controlling the ingress and egress of these ducts, so that the air currents find ingress to the chamber through certain of the ducts, and the moisture laden air, egress through certain other of the ducts, so that the air must pass through the body of grain in the chamber, such mechanism being capable of actuation to simultaneously adapt the ducts, previously serving for ingress of air, for egress thereof, and those previously serving for egress of air, as ingress ducts. By this arrangement the grain may be thoroughly and uniformly dried, and the mechanism accomplishing this object is inexpensive to manufacture, efficient in action, easily manipulated, and susceptible of ready repair.

Other objects of the invention will appear in the following detailed description, taken in connection with the accompanying drawings forming a part of this specification, and in which drawings:

Figure 1 is a side elevation of a drier, the ducts of which are controlled by mechanism constructed according to the invention, a part of the air distributing chamber being broken away to disclose details. Fig. 2 is a sectional view on the line 2—2 of Fig. 1.
Fig. 3 is a sectional view on the line 3—3 of Fig. 1.

In the drawings, where similar characters refer to similar parts, A designates a drying chamber including oppositely disposed walls, each having a plurality of apertures 5. About one wall 4 is provided an air distributing chamber B, to which air, at the desired temperature, is fed, as through way C, and in any suitable manner, such as described in the aforesaid copending application.

Open at the apertures 5 and extending transversely through chamber A, are ducts 6, each duct being open to one aperture in each wall. These ducts are pervious to fluid, such as air, but prevent the grain, which is dropped into the said chamber, from finding egress therefrom through the said apertures 5. As to the preferred construction of these ducts, reference may be had to Letters Patent 1,028,899, granted on an application filed by me, although any form of construction of ducts may be provided, without departing from the spirit or scope of the present invention, consistent with the desideratum,—that the body of grain be accessible for entrance or egress of air from walls of said ducts.

Exterially of the wall 4 are provided upright guide-ways 7, such as by disposing angle bars 8, preferably in parallelism, laterally in spaced apart relation to such wall, as by spacers 9. The guide-ways 7 receive portions of shutters 10, which latter are held in spaced apart relation to each other as by upright angle bars 11 and 12, riveted or otherwise secured to the shutters. The bars 11 may abut with flanges against the flanges of bars 8, which latter then serve as tracks for guiding or preventing the shutters from end-wise movement, as is obvious from an inspection of Fig. 1 of the drawing.

The several ducts are preferably arranged in tiers, or in other words, the apertures 5 are preferably alined longitudinally of the shutters 10, so that one end of each alternate tier of ducts is open at one side of each wall 4, the shutters being in spaced apart relation to each other so that the other duct openings on the said side are closed. The same condition exists at the other wall of the chamber.

Now, in order to provide novel means whereby, during operation of the drier, each duct has only one end open at either wall 4, and whereby such openings may be alternated from one wall of the chamber to the other, I provide positive mechanism designated generally by D. This mechanism D comprises a shaft 13 extending transversely through the chamber A, preferably having bearings in the walls 4 thereof, and preferably disposed substantially midway between the sides of said chamber; two gears 14, one adjacent the exterior of each wall 4; a rack 15 for coaction with each gear 14, movable with shutters 10 and disposed to extend longitudinally of the ways 7. The racks 15 may be riveted or otherwise secured to the bars 12, and it is to be noted that, by disposing the racks to engage with their respective gears at opposite sides of the shaft 13, upon circumferential movement of these gears, the shutters 10, at both walls, are moved in counter directions. Furthermore, by disposing the shaft 13 substantially midway between the side walls of the chamber A, or, in other words, substantially midway between the ends of the shutters 10, the application of a force to move the shutters is closely adjacent the axis of symmetry of the shutter structures, and hence, the same may be easily actuated by movement of the shaft 13. To facilitate rotation of the shaft 13, it may carry a sprocket wheel 16 about which is trained a sprocket chain 17. The latter may have movement imparted thereto in any suitable manner, so that the shaft 13 may be easily rotated. It is to be further noted that either the bars 11 or 12, or both, may be of such length, depending below the lowermost shutter 10, as to limit movement of the racks 14, when the lowermost tier of ducts have been successively closed at either wall 4 of chamber A.

The operation of the mechanism is as follows:
Grain is fed, as by gravity, into chamber A, either to accumulate therein or to merely pass through the same, as may be desired, the procedure being determined as to whether or not the grain contains a considerable amount of moisture. Air at the desired temperature is conveyed through way C and distributing chamber B, finding ingress to the chamber A, through the apertures 5, in the wall 4 about which said chamber B is disposed, which are not throttled by shutters 10, and into ducts 6. Inasmuch as the other openings of the ducts through which the air enters the chamber are closed, the air must filter through the body of grain about these ducts, and find egress from the chamber A through the openings in the wall opposite from that of ingress, and through ducts other than that in which it enters.
It is to be noted that the grain may accumulate entirely about the ducts 6 so that the maximum degree of heat, of the air, is utilized for drying purposes, and not absorbed, to any material extent, by the walls of the ducts. Furthermore, the grain is uniformly dried because of the ability of the air to be diffused in all directions through the body of grain. By merely rotating shaft 13, the ingress of air to the chamber A may be provided through the duct openings previously throttled, and hence, the air will find different paths through the grain, than that previously followed. Thus the efficiency of the apparatus for uniformly drying the grain is augmented.
It is to be noted that little effort is required to move the shutters in counter directions, to effect this change, and that few parts are essential to make up the duct control mechanism.
Changes in details may be made without departing from the spirit or scope of the invention; but,

I claim:—

1. The combination with a drier including a chamber having oppositely disposed walls and ducts, pervious to fluid, passing transversely through the chamber and open at the outer faces of the said walls, of a shutter structure at the outer face of each of the said walls and adapted to cover the openings of certain of said ducts, the shutter structure at one wall being arranged relative to the shutter structure at the other wall, so that each duct has but one opening throttled by such shutter structures, a shaft extending transversely of the said walls of said chamber, and mechanism operable from said shaft and operatively connected with said shutter structures to simultaneously actuate the same to throttle openings of said ducts previously unthrottled, and to unthrottle the said openings of said ducts previously throttled.

2. The combination with a drier including a chamber having oppositely disposed walls and ducts, pervious to fluid, passing transversely through the chamber and open at the outer faces of the said walls, of a shutter structure at the outer face of each of the said walls and adapted to cover the openings of certain of said ducts, the shutter structure at one wall being arranged relative to the shutter structure at the other wall, so that each duct has but one opening throttled by such shutter structures, a shaft extending transversely through said chamber substantially midway between the end margins of said shutter structures, and mechanism operable from said shaft and operatively connected with said shutter structures to simultaneously actuate the same to throttle the openings of said ducts previously unthrottled, and to unthrottle the said openings of said ducts previously throttled.

3. The combination with a drier including a chamber having oppositely disposed walls and ducts, pervious to fluid, passing transversely through the chamber and open at the outer faces of the said walls, of a shutter structure at the outer face of each of the said walls and adapted to cover the openings of certain of the said ducts, the shutter structure at one wall being arranged relative to the shutter structure at the other wall, so that each duct has but one opening throttled by such shutter structure, a shaft extending transversely through said chamber, and mechanism operable from said shaft and operatively connected with said shutter structures to simultaneously actuate the same in counter directions, substantially as and for the purpose set forth.

4. The combination with a drier including a chamber having oppositely disposed walls and ducts, pervious to fluid, passing transversely through the chamber and open at the outer faces of the said walls, of symmetrical shutter structures at the outer faces of each of said walls and adapted to cover the openings of certain of the said ducts, the shutter structure at one wall being arranged relative to the shutter structure at the other wall, so that each duct has but one opening throttled by such shutter structures, and mechanism operatively connected with said shutter structures adjacent the axes of symmetry thereof, to simultaneously actuate the same to throttle the openings of said ducts previously unthrottled, and to unthrottle the said openings of said ducts previously throttled.

5. The combination with a drier including a chamber having oppositely disposed walls and ducts pervious to fluid, passing transversely through the chamber and open at the outer faces of the said walls, of symmetrical shutter structures at the outer faces of each of said walls and adapted to cover the openings of certain of the said ducts, the shutter structure at one wall being arranged relative to the shutter structure at the other wall, so that each duct has but one opening throttled by such shutter structure, and mechanism operatively connected with said shutter structures adjacent the axes of symmetry thereof, to simultaneously actuate the same in counter directions, substantially as and for the purpose set forth.

6. The combination with a drier including a chamber having oppositely disposed walls and ducts, pervious to fluid, passing transversely through the chamber and open at the outer faces of the said walls, of a shutter structure at the outer face of each of said walls and adapted to cover the openings of certain of the said ducts, the shutter structure at one wall being arranged relative to the shutter structure at the other wall, so that each duct has but one opening throttled by such shutter structures, a shaft extending transversely of the said chamber, two gears on said shaft, one adjacent each of the said walls, and two racks operatively connected with said shutter structures and comeshing with said gears, said racks being disposed with respect to each other at opposite sides of said shaft to simultaneously actuate said shutter structures in counter directions upon circumferential movement of said shaft, substantially as and for the purpose set forth.

7. The combination with a drier including a chamber having oppositely disposed walls and ducts, pervious to fluid, passing transversely through the chamber and open at the outer faces of the said walls, of a shutter structure at the outer face of each of said walls and adapted to cover the openings of certain of the said ducts, the shutter structure at one wall being arranged relative to the shutter structure at the other wall, so that each duct has but one opening throttled by such shutter structures, a shaft extending transversely of the said chamber, two gears on said shaft, one adjacent each of the said walls, two reciprocable racks operatively connected with said shutter structures, one for each, and comeshing with said gears, said racks being disposed with respect to each other at opposite sides of the said shaft to simultaneously actuate said shutter structures in counter directions upon circumferential movement of said shaft, and means for limiting the amplitude of reciprocation of said racks, substantially as and for the purpose set forth.

8. The combination with a drier including a chamber having oppositely disposed walls and ducts, pervious to fluid, passing transversely through said chamber and open at the outer faces of the said walls, of parallel bars providing guide-ways laterally of the said walls of said chamber at the exterior thereof, shutters movable in the said guideways, bars connecting the shutters of each side, in spaced apart relation to each other to move in unison, said second-mentioned bars abutting against said first-mentioned bars to prevent end-wise movement of said shutters, and said shutters being disposed so that each duct has but one opening throttled thereby, and means for actuating said shutters, to throttle the openings of said ducts previously unthrottled, and to unthrottle the openings of the said ducts previously throttled.

9. The combination with a drier including a chamber having oppositely disposed walls and ducts, pervious to fluid, passing transversely through the chamber and open at the outer faces of the said walls, of a shutter at the outer face of each of said walls and adapted to cover the openings of certain of said ducts, the shutter at one wall being arranged relative to the shutter at the other wall, so that each duct has but one opening throttled by such shutters, and mechanism operatively connected with said shutters adjacent the axes of symmetry thereof, to simultaneously actuate the same to throttle the openings of said ducts previously unthrottled, and to unthrottle said openings of said ducts previously throttled.

FULTON R. MORRIS.

Witnesses:
M. E. JONES, Jr.,
LOTTIE W. CLOUGH.